United States Patent
Yang et al.

(10) Patent No.: US 10,627,949 B2
(45) Date of Patent: Apr. 21, 2020

(54) DISPLAY SUBSTRATE, METHOD FOR DRIVING THE SAME, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Hailin Xue, Beijing (CN); Xiaochuan Chen, Beijing (CN); Haisheng Wang, Beijing (CN); Xiaoliang Ding, Beijing (CN); Weijie Zhao, Beijing (CN); Yingming Liu, Beijing (CN); Changfeng Li, Beijing (CN); Lei Wang, Beijing (CN); Rui Xu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 156 days.

(21) Appl. No.: 15/291,660

(22) Filed: Oct. 12, 2016

(65) Prior Publication Data

US 2017/0255322 A1 Sep. 7, 2017

(30) Foreign Application Priority Data

Mar. 4, 2016 (CN) .......................... 2016 1 0124311

(51) Int. Cl.
*G06F 3/041* (2006.01)
*G06F 3/044* (2006.01)
*G02F 1/1333* (2006.01)

(52) U.S. Cl.
CPC ........ *G06F 3/0416* (2013.01); *G02F 1/13338* (2013.01); *G06F 3/044* (2013.01); *G06F 3/0412* (2013.01)

(58) Field of Classification Search
CPC ...... G06F 3/0416; G06F 3/0412; G06F 3/044; G06F 2203/04111; G06F 2203/04105
See application file for complete search history.

(56) References Cited

U.S. PATENT DOCUMENTS 9,823,765 B2 * 11/2017 Lee .................. G06F 3/0412
2007/0195029 A1 * 8/2007 Jeon .................. G02F 1/13338
345/87

(Continued)

FOREIGN PATENT DOCUMENTS

CN 102914920 A 2/2013
CN 103885637 A 6/2014
(Continued)

OTHER PUBLICATIONS

First Office Action for Chinese Application No. 201610124311.8, dated Nov. 16, 2017, 7 Pages.

*Primary Examiner* — Vinh T Lam
(74) *Attorney, Agent, or Firm* — Brooks Kushman P.C.

(57) ABSTRACT

The present disclosure discloses a display substrate and a driving method thereof, a display device. The display substrate includes a first substrate and a second substrate which are oppositely arranged, sensing electrodes arranged on the first substrate, and a common electrode arranged on the second substrate, and configured to receive a common voltage signal at a display stage. The common electrode includes a first electrode region. At a pressure sensing stage, the first electrode region includes pressure driving electrodes configured to receive pressure driving voltage signals. Each (Continued)

pressure driving electrode and the corresponding sensing electrode form a pressure sensing capacitor.

16 Claims, 3 Drawing Sheets

(56) References Cited

U.S. PATENT DOCUMENTS

| | | | |
|---|---|---|---|
| 2011/0141042 A1* | 6/2011 | Kim | G02F 1/13338 |
| | | | 345/173 |
| 2013/0050130 A1 | 2/2013 | Brown | |
| 2014/0132526 A1 | 5/2014 | Lee et al. | |
| 2014/0247239 A1* | 9/2014 | Jamshidi-Roudbari | |
| | | | G06F 3/0414 |
| | | | 345/174 |
| 2016/0139719 A1 | 5/2016 | Liu et al. | |
| 2016/0188040 A1* | 6/2016 | Shin | G06F 3/047 |
| | | | 345/174 |
| 2016/0274712 A1* | 9/2016 | Liu | G06F 3/0412 |
| 2016/0370908 A1* | 12/2016 | Kim | G06F 3/044 |
| 2017/0235414 A1 | 8/2017 | Ding et al. | |
| 2017/0351354 A1* | 12/2017 | Yoon | G06F 3/044 |
| 2017/0371470 A1* | 12/2017 | Nathan | G06F 3/0414 |
| 2018/0004306 A1* | 1/2018 | Ebisui | H01H 13/702 |

FOREIGN PATENT DOCUMENTS

| | | |
|---|---|---|
| CN | 105068695 A | 11/2015 |
| CN | 204926053 U | 12/2015 |

* cited by examiner

DISPLAY SUBSTRATE, METHOD FOR DRIVING THE SAME, AND DISPLAY DEVICE

CROSS-REFERENCE TO RELATED APPLICATIONS

This application claims priority to Chinese Patent Application No. 201610124311.8 filed on Mar. 4, 2016, the disclosure of which is incorporated in its entirety by reference herein.

TECHNICAL FIELD

The present disclosure relates to the field of display technology, in particular to a display substrate, a method for driving the same, and a display device.

BACKGROUND

Currently as a leader in the field of liquid crystal display, ADS (Advanced super Dimension Switch) display technology is gradually sought by consumers with its wide viewing angle, higher contrast ratio, higher resolution and brighter color rendering. Meanwhile, with the wide application of In Cell Touch technology first introduced by Apple in 2012, there are already smart terminal manufacturers that have adopted In Cell Touch technology on ADS display modules and putted it into production successfully.

Pressure sensing technology refers to a technology that is capable of performing detection of an external force and has been used first in the industrial and medical fields. Led by Apple, many smart terminal manufacturers are looking for appropriate solutions to implement pressure sensing in the display field, especially in the field of mobile phone or tablet, so that customers may get better man-machine interaction experience. However, until now, more terminal manufacturers implement it in the backlight part of LCD (Liquid Crystal Display) or the intermediate bezel part of the smart terminal by adding additional mechanisms. This design approach requires changes in the mechanism design of the smart terminal, and because of a large assembly tolerance, this design approach has great limitations on the accuracy of pressure detection.

SUMMARY

The main purpose of the present disclosure is to provide a technical solution that may not necessarily change the mechanism design of the terminal, and may reduce the assembly tolerance and improve detection accuracy for pressure.

To this end, according to one aspect of the present disclosure, a display substrate is provided, comprising a first substrate and a second substrate which are oppositely arranged, including: sensing electrodes arranged on the first substrate; a common electrode arranged on the second substrate, and configured to receive a common voltage signal at a display stage, the common electrode including a first electrode region, at a pressure sensing stage, the first electrode region includes a pressure driving electrode configured to receive pressure driving voltage signals, and each pressure driving electrode and the corresponding sensing electrode forming a pressure sensing capacitor.

Optionally, the common electrode region further includes a second electrode region, at a touch stage, the second electrode region includes touch driving electrodes configured to receive touch driving voltage signals, and each touch driving electrode and the corresponding sensing electrode form a touch capacitor.

Optionally, the first electrode region comprises a plurality of rows of first sub-electrodes, and the second electrode region comprises a plurality of rows of second sub-electrodes, wherein the rows of the first sub-electrodes and the rows of second sub-electrodes are arranged alternately.

Optionally, each of the second sub-electrodes is connected to a common electrode line through a via hole, the common electrode line is in parallel with an extending direction of each row of the second sub-electrodes, and at the touch stage, a touch driving voltage signals are transmitted to the second sub-electrodes through the common electrode lines.

Optionally, each of the first sub-electrodes is connected to a preset metal wire through a via hole, the preset metal wire and the common electrode line are at different layers and perpendicular to each other, and at the pressure sensing stage, a pressure driving voltage signals are transmitted to the first sub-electrodes through the preset metal wires.

Optionally, the first sub-electrodes are of an identical size.

Optionally, the second sub-electrodes are of an identical size.

Optionally, the first sub-electrodes are of an identical size, the second sub-electrodes are of an identical size, and the size of each first sub-electrode is identical to the size of e each second sub-electrode.

Optionally, the first substrate is a color filter substrate, and the second substrate is an array substrate.

According to another aspect of the present disclosure, a display device is further provided, including the display substrate.

According to another aspect of the present disclosure, a display substrate driving method for driving the display substrate hereinabove is further provided, the display substrate driving method comprising: at a sensing pressure stage, transmitting pressure driving voltage signals to a first electrode region; at a display stage, transmitting a common voltage signal to a common electrode.

Optionally, the display substrate driving method further comprises: at a touch stage, transmitting touch driving voltage signals to the first electrode region.

Optionally, the sensing electrodes are in parallel with the common electrode lines.

Optionally, the sensing electrodes are arranged at an inner side of the color filter substrate.

Compared with the related art, the display substrate and the driving method thereof, the display device of the present disclosure does not need to make additional mechanism design for the backlight part of a display module or the intermediate bezel part of the smart terminal, avoids an excessive assembly tolerance caused by the mechanism design change, and improves the accuracy of the pressure detection.

DETAILED DESCRIPTION

Figure 1:
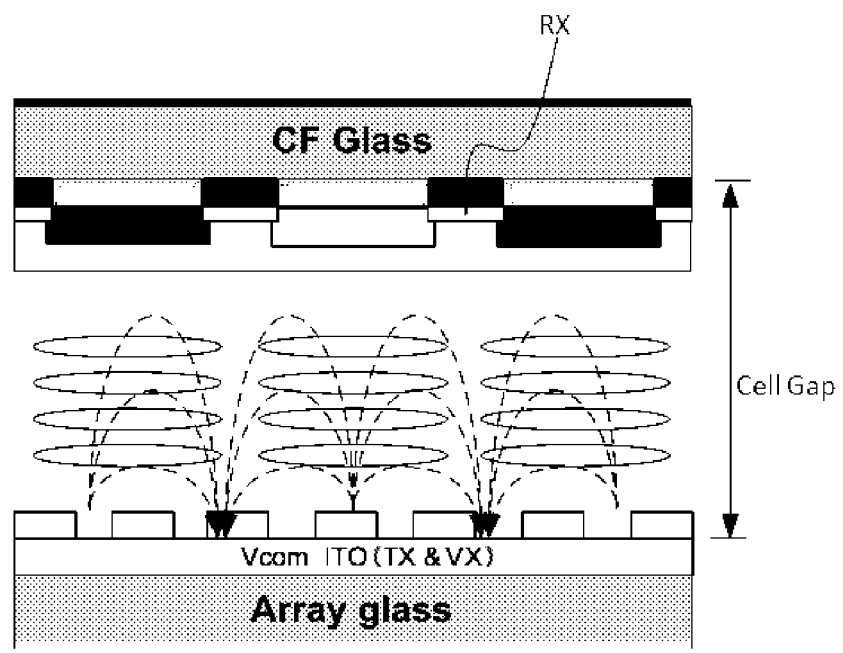
FIG. 1 is a sectional view a display substrate in some embodiments of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Below in connection with the accompanying drawings in the embodiments of the present disclosure, the technical solutions in the embodiments of the present disclosure are clearly and completely described. Obviously, the described embodiments are merely part instead of all of the embodiments of the present disclosure. Based on the embodiments of the present disclosure, all other embodiments obtained by those of ordinary skill in the art, without creative work, fall within the scope of the present disclosure.

Currently, in the process of implementing a pressure sensing technology, Apple and other terminal manufacturers usually employ a design approach that adds an additional mechanism in the backlight part of LCD or the intermediate bezel part of the smart terminal, but this design approach requires great changes in the mechanism design of the smart terminal, resulting in a large assembly tolerance, thus affecting the accuracy of the pressure detection.

On this basis, the present disclosure mainly employs the idea of multiplexing functions of mechanisms in the related art to provide a new pressure sensing technical solution, in which multiplexing functions is mainly embodied as multiplexing in a time division manner the common electrode for displaying in the smart terminal, at a display stage of the smart terminal, the entire region of the common electrodes plays the role of receiving the common reference voltages, and at the pressure sensing stage, a part of the electrode regions of common electrodes receive pressure driving voltage signals.

A display substrate is provided in some embodiments of the present disclosure, including a first substrate and a second substrate which are oppositely arranged; sensing electrodes arranged on the first substrate; and a common electrode arranged on the second substrate, and configured to receive a common voltage signal at a display stage. The common electrode includes a first electrode region. At a pressure sensing stage, the first electrode region includes pressure driving electrodes configured to receive pressure driving voltage signals, and each pressure driving electrode and the corresponding sensing electrode form a pressure sensing capacitor.

In some embodiments of the present disclosure, the first substrate may be a color filter substrate and the second substrate may be an array substrate. That is, the common electrodes are arranged on the array substrate, and the sensing electrodes are arranged on a surface of the color filter substrate opposite to the array substrate. In this way, at the pressure sensing stage, a certain region of the common electrode serves as the pressure driving electrodes, which may form pressure sensing capacitors together with the sensing electrodes which are arranged oppositely after receiving the pressure driving voltage signals. A change of a pressure performed by the user may be determined based on the change of the capacitance of the pressure sensing capacitors, thereby achieving a pressure touch control.

Of course, the above display substrate is common in the related art. Limited by the current display technology, the common electrodes are generally required to be arranged on the array substrate, and the sensing electrodes may be arranged on the color filter substrate arranged oppositely to the array substrate. In addition, the manufacturers are more willing to adopt this design approach, but some may also provide the sensing electrodes on other types of substrates like a cover, or on the array substrate, which depends on different design requirements.

Since the common electrode may be multiplexed as the pressure driving electrodes at the pressure sensing stage, a further time-division multiplexing may be performed on the common electrodes. For example, the common electrode may further serve as the touch driving electrodes (i.e., the driving electrode in capacitive touch technology in the touch screens in the related art).

In some embodiments of the present disclosure, the common electrode further includes a second electrode region. At a touch stage, the second electrode region serves as touch driving electrodes receiving touch driving voltage signals, each touch driving electrode and the corresponding sensing electrode form a touch capacitor.

For ease of understanding, referring to FIG. 1 (FIG. 1 is a schematic view of a cross-sectional structure of a display substrate in some embodiments of the present disclosure), the display substrate shown in FIG. 1 may be preferably applied to an ADS display screen, as shown in FIG. 1, the common electrode (Vcom ITO) may be divided into regions, where some regions as the touch driving electrodes (TX), and the other regions serve as the pressure driving electrodes (VX). The sensing electrode (RX) may be arranged at an inner side of the color filter substrate, thereby to achieve a full in cell.

That is, in some embodiments of the present disclosure, the common electrode may be multiplexed in a time division manner in three periods. That is, at the display stage, the common electrode is configured to receive the common voltage signal to display an image; at the pressure sensing stage, a part of the common electrode is configured to receive the pressure driving voltage signals and detect the user's pressure operation to implement the pressure sensing. At the touch stage, the other part of the common electrode is configured to receive the touch driving voltage signals and detect the user's touch operation to implement the touch control.

Even, other new touch technology that may emerge in the future also may adopt the multiplexing idea of the disclosed embodiment, and it is theoretically possible to divide another electrode region from the common electrode and time division multiplexing this electrode region.

In some embodiments of the present disclosure, the first electrode region may include a plurality of rows of first sub-electrodes, and the second electrode region may comprise a plurality of rows of second sub-electrodes. The rows of the first sub-electrodes and the rows of the second sub-electrodes are arranged alternately.

That is, at the pressure sensing stage, each first sub-electrode may serve as a pressure driving electrode configured to receive the pressure driving voltage signals. At the touch stage, each second sub-electrode may serve as the touch driving electrode configured to receive the touch driving voltage signals.

For the leading-out mode for the first sub-electrodes and the second sub-electrodes, the following manner is given in some embodiments of the present disclosure:

each of the second sub-electrodes is connected to the common electrode line through a via hole, the common electrode line is in parallel with an extending direction of each row of the second sub-electrodes, and at the touch stage, the touch driving voltage signal are transmitted to the second sub-electrodes through the common electrode lines.

In practice, due to the presence of a design approach in which the common electrode is multiplexed as the touch driving electrode, generally in order not to increase design difficulty, the touch driving electrode may be connected to the common electrode line through a via, and moreover, the sensing electrodes (e.g., linearly arranged RX) provided on the color filter substrate are in parallel with the common electrode lines.

Each of the first sub-electrodes is connected to a preset metal wire through a via hole, the preset metal wire and the common electrode line are at different layers and perpendicular to each other, and at the pressure sensing stage, a pressure driving voltage signal are transmitted to the first sub-electrodes through the preset metal wires.

Figure 2:
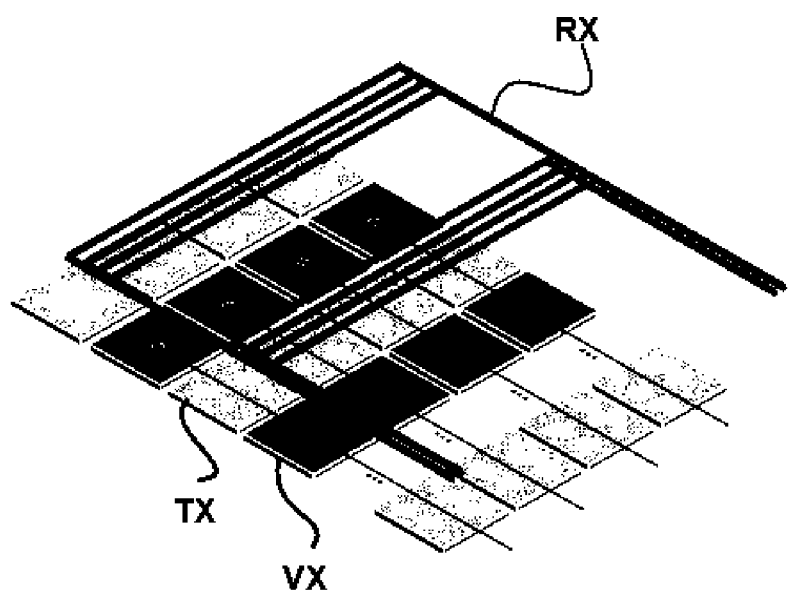
FIG. 2 is a schematic view 1 of an electrode distribution of the display substrate in some embodiments of the present disclosure.

For ease of design, a plurality of metal wires (i.e., the above-mentioned preset metal wire) may be provided separately as leading-out lines of the first sub-electrodes. At this time, in order to prevent the leading-out lines from crossing the common electrode lines, the preset metal wires may be further arranged at different layers. For ease of understanding, also refer to FIG. 2 at the same time (FIG. 2 is a schematic view 1 of electrode distribution of the display substrate according to the embodiments of the present disclosure).

The first sub-electrodes may be designed to have the same size. In such a way, at the pressure sensing stage, with the same pressure driving voltage signal, each of the first sub-electrodes together with the sensing electrode constitutes the same pressure sensing capacitor. From the user's perspective, the detection precision of pressure sensing is the same. Of course, in real application, the first sub-electrodes may also be designed to have different sizes, and this is not defined in the disclosed embodiments.

The second sub-electrodes may also be designed to have the same size. In such a way, at the touch stage, with the same touch driving voltage signal, each of the second sub-electrodes together with the sensing electrode constitutes the same touch sensing capacitor. From the user's perspective, the detection precision of touch sensing is the same. Of course, in practical application, the second sub-electrodes may also be designed to have different sizes, which is not limited herein.

In some embodiments of the present disclosure, all of the first sub-electrodes may be designed to have an identical size, and all of the second sub-electrodes may be designed to have an identical size Furthermore, the sizes of the first sub-electrodes may be further designed to be identical to that of the second sub-electrodes. That is, the first sub-electrodes serving as the pressure driving electrode and the second sub-electrodes serving as the touch driving are designed to have the same size, so that such design may facilitate the molding process and balance pressure sensing detection precision and touch detection precision.

Figure 3:
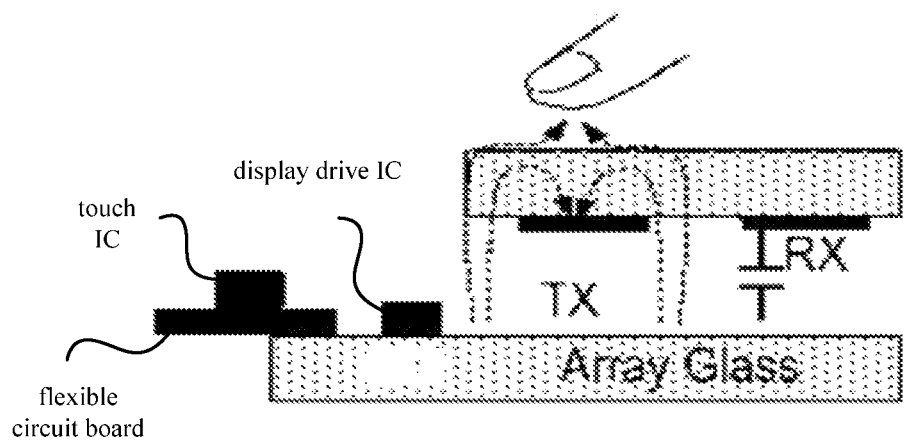
FIG. 3 is a schematic view 2 of an electrode distribution of the display substrate in some embodiments of the present disclosure.

For example, shown in FIG. 3, which is a schematic view 2 of electrode distribution of the display substrate in some embodiments of the present disclosure, the original common electrode (Vcom ITO) may be designed to be equal-size squares (TX and VX). TXs are connected to each other through horizontal Gate Vcom lines (as the touch driving electrode), VXs are connected to each other through vertical metal electrodes, while VX electrodes are distributed alternately between internal Pattern of the same TX electrode. On the color filter side above VX, RX meshes are made of metal (the RX direction consistent with the Vcom direction).

Figure 4:
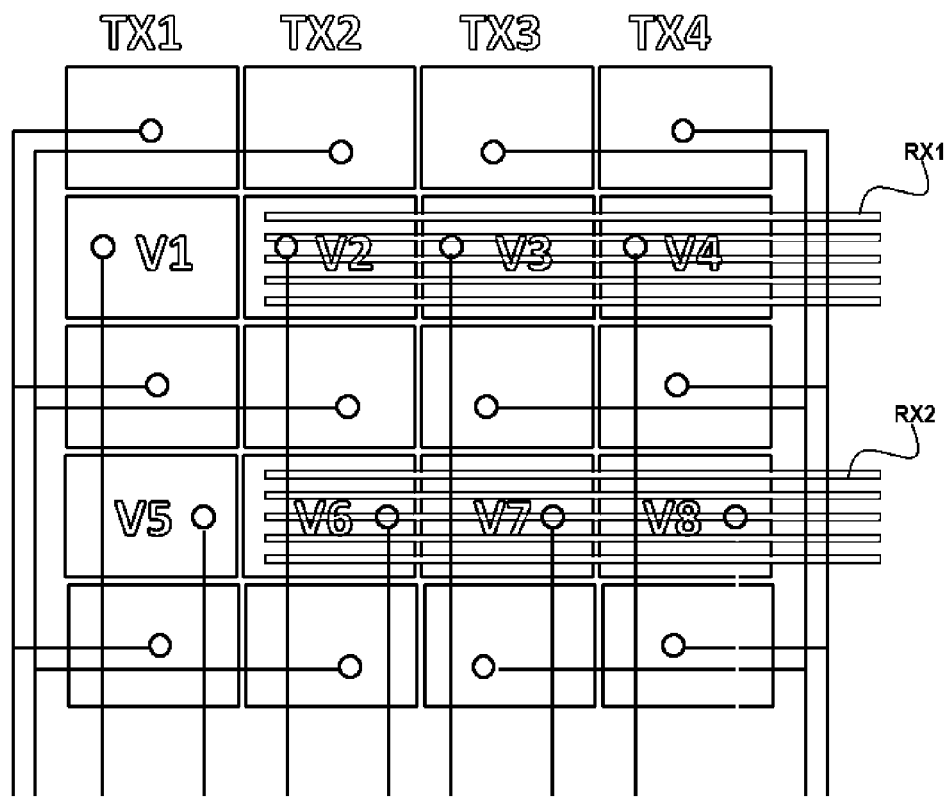
FIG. 4 is a schematic view 3 of an electrode distribution of the display substrate in some embodiments of the present disclosure.

FIG. 4 is a schematic view 3 of electrode distribution of the display substrate in some embodiments of the present disclosure. As shown in FIG. 4, when a pressure is applied onto the surface of the screen, in addition to identifying the touch position of the finger and the changes in capacitance between TX and RX, it is further required to identify the change in coupling capacitance between VX and RX, thereby sense the pressure through the change in value of the capacitance.

On the basis of the display substrate, a display device is further provided in some embodiments of the present disclosure, including the display substrate hereinabove, and the improvement of the display device being characterized by the display substrate abovementioned. Since the display substrate has already been introduced previously, the display device will not be described herein again in combination with the accompanying drawings.

Figure 5:
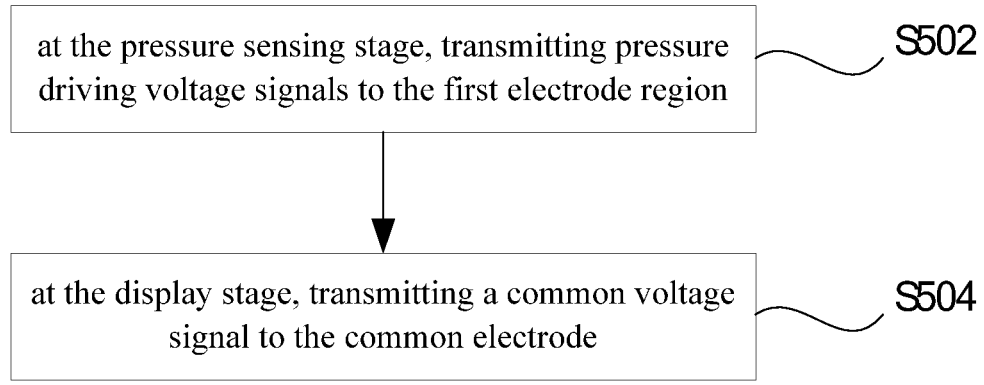
FIG. 5 is a flowchart of a display substrate driving method in some embodiments of the present disclosure.

Corresponding to the display substrate, a method for driving a display substrate in some embodiments of the present disclosure is further provided, for driving the display substrate hereinabove. FIG. 5 is a flowchart of a display substrate driving method in some embodiments of the present disclosure. As shown in FIG. 5, the display substrate driving method comprises the following process steps (steps S502-S504):

Step S502, at the pressure sensing stage, transmitting pressure driving voltage signals to the first electrode region;

Step S504, at the display stage, transmitting a common voltage signal to the common electrode.

As a preferred example, the method for the display substrate may further comprise the step of:

at the touch stage, transmitting the touch driving voltage signals to the first electrode region.

Figure 6:
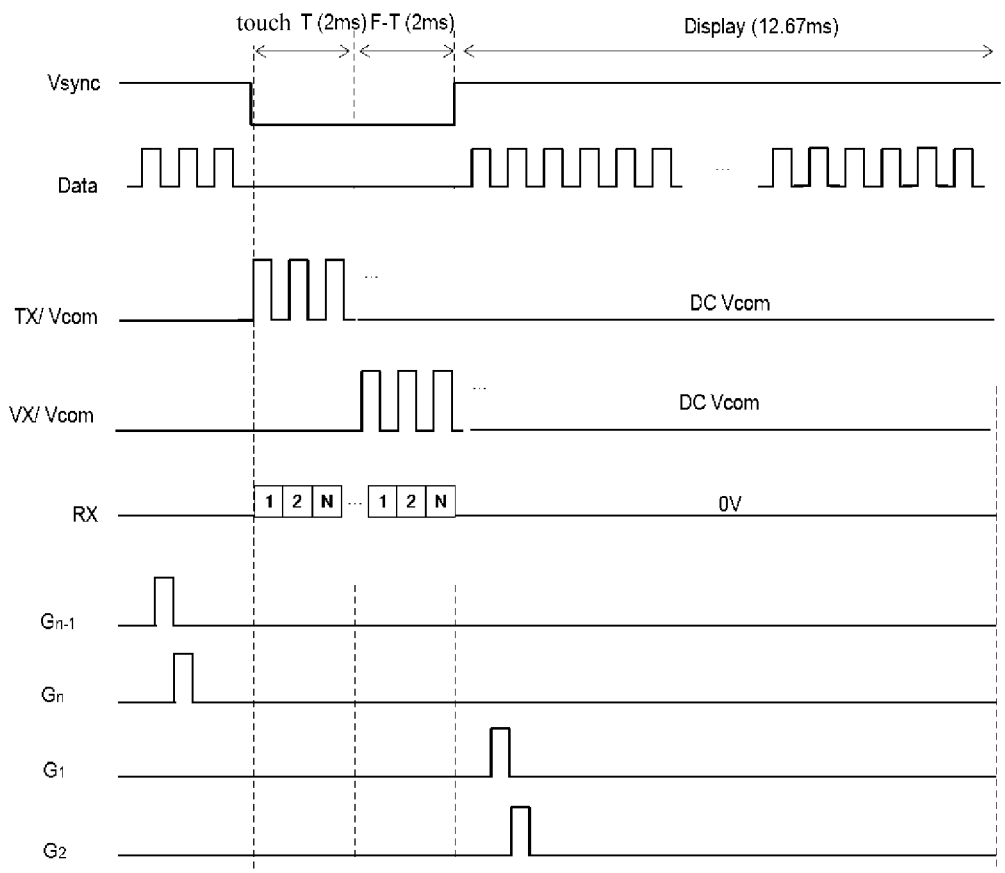
FIG. 6 is a timing chart of the display substrate driving method in some embodiments of the present disclosure.

For ease of understanding of the timing of the display substrate driving method, please refer to FIG. 6 (FIG. 6 is a timing chart of the display substrate driving method in some embodiments of the present disclosure). As can be seen in conjunction with FIG. 6, the display substrate provided in some embodiments of the present disclosure adopt a time-sharing driving approach, and the driving timing is divided into three intervals as follows: Touch stage being divided into touch stage (TX and RX) and pressure sensing stage (VX and RX), the additional display stage being 12.67 ms.

Of course, these are just some embodiments of the present disclosure, and in practical applications, the driving time and other parameters may be changed in combination with the design requirements, which will not be defined herein as long as satisfying the three functions of time division multiplexing.

The disclosed embodiments utilize the manner of optimizing the ADS pixel structure to divide and multiplex the common electrode (Vcom ITO) into the pressure driving electrode (VX) and the touch driving electrode (TX), to form mutually capacitive pressure driving and touch driving electrode patterns, while disposing the sensing electrode inside the color filter substrate, above the common electrode vertically. With such new in Cell Touch integrated pressure sensing touch modular structure design, high product added-value may be increased, avoiding a too large assembly tolerance caused by greater changes in the structure of the terminal from the design approach in the related art, and greatly improving the accuracy of pressure detection.

The forgoing is preferred embodiments of the present disclosure. It should be noted that those of ordinary skill in the art may further make a number of improvements and modifications without departing from the principles of the present disclosure, which shall also be considered as included within the scope of protection of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A display substrate, comprising:
    a first substrate and a second substrate which are oppositely arranged;
    sensing electrodes arranged on the first substrate; and
    a common electrode arranged on the second substrate, and configured to receive a common voltage signal at a display stage;
    wherein the common electrode comprises a first electrode region;
    at a pressure sensing stage, the first electrode region comprises pressure driving electrodes configured to receive pressure driving voltage signals, and each pressure driving electrode and the corresponding sensing electrode form a pressure sensing capacitor;
    wherein the common electrode further comprises a second electrode region;
    the second electrode region comprises touch driving electrodes configured to, at a touch stage, receive touch driving voltage signals, and each touch driving electrode and the corresponding sensing electrode form a touch capacitor;
    the second electrode region further comprises a plurality of second electrodes each extending in a column direction, the second electrodes are arranged in a row direction, and each second electrode consists of a plurality of second sub-electrodes separated from each other;
    an orthographic projection of each sensing electrode onto the first substrate completely falls into an orthographic projection of a region between the second sub-electrodes adjacent in the column direction onto the first substrate, and the orthographic projection of each sensing electrode onto the first substrate does not overlap an orthographic projection of the second sub-electrodes onto the first substrate; and
    the pressure driving electrodes and the second sub-electrodes of each second electrode are arranged alternately in the column direction.

2. The display substrate according to claim 1, wherein the first electrode region comprises a plurality of rows of first sub-electrodes, wherein the rows of the first sub-electrodes and the rows of the second sub-electrodes are arranged alternately.

3. The display substrate according to claim 2, wherein each of the second sub-electrodes is connected to a common electrode line through a via hole, the common electrode line is in parallel with an extending direction of each row of the second sub-electrodes, and at the touch stage, the touch driving voltage signals are transmitted to the second sub-electrodes through the common electrode lines.

4. The display substrate according to claim 3, wherein each of the first sub-electrodes is connected to a preset metal wire through a via hole, the preset metal wire and the common electrode line are at different layers and perpendicular to each other, and at the pressure sensing stage, the pressure driving voltage signals are transmitted to the first sub-electrodes through the preset metal wires.

5. The display substrate according to claim 4, wherein the first sub-electrodes are of an identical size.

6. The display substrate according to claim 4, wherein the second sub-electrodes are of an identical size.

7. The display substrate according to claim 4, wherein the first sub-electrodes are of an identical size, the second sub-electrodes are of an identical size, and a size of each first sub-electrode is identical to a size of each second sub-electrode.

8. The display substrate according to claim 3, wherein the sensing electrodes are in parallel with the common electrode lines.

9. The display substrate according to claim 1, wherein the first substrate is a color filter substrate, and the second substrate is an array substrate.

10. The display substrate according to claim 9, wherein the sensing electrodes are arranged at an inner side of the color filter substrate.

11. A display device, including a display substrate, wherein the display substrate comprises:
    a first substrate and a second substrate which are oppositely arranged;
    sensing electrodes arranged on the first substrate; and
    a common electrode arranged on the second substrate, configured to receive a common voltage signal at a display stage;
    wherein the common electrode comprises a first electrode region;
    at a pressure sensing stage, the first electrode region comprises pressure driving electrodes configured to receive pressure driving voltage signals, and each pressure driving electrode and the corresponding sensing electrode form a pressure sensing capacitor;
    wherein the common electrode further comprises a second electrode region;
    the second electrode region comprises touch driving electrodes configured to, at a touch stage, receive touch driving voltage signals, and each touch driving electrode and the corresponding sensing electrode form a touch capacitor;
    the second electrode region further comprises a plurality of second electrodes each extending in a column direction, the second electrodes are arranged in a row direction, and each second electrode consists of a plurality of second sub-electrodes separated from each other;
    an orthographic projection of each sensing electrode onto the first substrate completely falls into an orthographic projection of a region between the second sub-electrodes adjacent in the column direction onto the first substrate, and the orthographic projection of each sensing electrode onto the first substrate does not overlap an orthographic projection of the second sub-electrodes onto the first substrate; and the pressure driving electrodes and the second sub-electrodes of each second electrode are arranged alternately in the column direction.

12. The display device according to claim 11, wherein the first electrode region comprises a plurality of rows of first sub-electrodes, wherein the rows of the first sub-electrodes and the rows of the second sub-electrodes are arranged alternately.

13. The display device according to claim 12, wherein each of the second sub-electrodes is connected to a common electrode line through a via hole, the common electrode line is in parallel with an extending direction of each row of the second sub-electrodes, and at the touch stage, the touch driving voltage signals are transmitted to the second sub-electrodes through the common electrode lines.

14. The display device according to claim 13, wherein each of the first sub-electrodes is connected to a preset metal wire through a via hole, the preset metal wire and the common electrode line are at different layers and perpendicular to each other, and at the pressure sensing stage, the pressure driving voltage signals are transmitted to the first sub-electrodes through the preset metal wires.

15. The display device according to claim 14, wherein the first sub-electrodes are of an identical size.

16. The display device according to claim 14, wherein the second sub-electrodes are of an identical size.

\* \* \* \* \*